United States Patent [19]

Hoeber et al.

[11] Patent Number: 5,276,795

[45] Date of Patent: Jan. 4, 1994

[54] METHOD AND APPARATUS FOR SELECTING AND EXECUTING DEFAULTS IN A WINDOW BASED DISPLAY SYSTEM

[75] Inventors: Anthony Hoeber, Woodside; Alan Mandler, San Francisco, both of Calif.; Norman Cox, Irving, Tex.

[73] Assignee: Sun Microsystems, Inc., Mountain View, Calif.

[21] Appl. No.: 875,194

[22] Filed: Apr. 24, 1992

Related U.S. Application Data

[63] Continuation of Ser. No. 458,775, Dec. 29, 1989, abandoned, which is a continuation-in-part of Ser. No. 323,775, Mar. 15, 1989, abandoned.

[51] Int. Cl.$^5$ ............................................... G06F 15/46
[52] U.S. Cl. ..................................... 395/156; 395/155
[58] Field of Search ............... 395/155, 156, 159, 157; 340/706, 747, 750

[56] References Cited

U.S. PATENT DOCUMENTS

| | | | |
|---|---|---|---|
| Re. 32,632 | 3/1988 | Atkinson | 340/709 |
| 4,533,910 | 8/1985 | Sukonick et al. | 340/721 |
| 4,555,775 | 11/1985 | Pike | 364/900 |
| 4,622,545 | 11/1986 | Atkinson | 340/747 |
| 4,748,618 | 5/1988 | Brown et al. | 370/94 |
| 4,785,408 | 11/1988 | Britton et al. | 364/513 |
| 4,812,834 | 3/1989 | Wells | 340/721 |
| 4,847,604 | 7/1989 | Doyle | 340/706 |
| 4,884,223 | 11/1989 | Ingle et al. | 364/550 |
| 4,899,136 | 2/1990 | Beard et al. | 340/706 |
| 4,914,732 | 4/1990 | Henderson et al. | 340/825 |
| 4,918,622 | 4/1990 | Granger et al. | 364/518 |
| 4,931,783 | 6/1990 | Atkinson | 340/710 |
| 4,935,865 | 6/1990 | Rowe et al. | 364/188 |
| 4,939,507 | 7/1990 | Beard et al. | 340/706 |
| 4,947,343 | 8/1990 | Amari | 364/518 |

FOREIGN PATENT DOCUMENTS 0239884 10/1987 European Pat. Off. .

OTHER PUBLICATIONS

Article entitled: Learning Considerations In User Interface Design: The Room Model; author: Patrick P. Chan; publication of the Software Portability Laboratory, University of Waterloo, Waterloo, Ontario, Canada, Jul., 1984.

Article entitled: Creation/Modification of the Audio Signal Processor Setup For A PC Audio Editor; publication of International Business Machines, IBM Technical Disclosure Bulletin, vol. 30, No. 10, Mar. 1988.

Article entitled: Browsing Within Time-Driven Multimedia Documents; authors: Stavros Christodoulakis and Steven Graham; publication of the Institute for Computer Research, University of Waterloo, Waterloo, Ontario, Canada, Jul., 1988.

Alexander, "Visualizing Cleared-Off Desktops" *Computer World*, May 6, 1991, p. 20.

*Primary Examiner*—Phu K. Nguyen
*Attorney, Agent, or Firm*—Blakely Sokoloff Taylor & Zafman

[57] ABSTRACT

An apparatus and method is disclosed which has application for use in computer controlled display systems, and in particular, display systems having object oriented graphic interfaces. A central processing unit (CPU) is provided and is coupled to a display for displaying graphic and other data. The CPU is further coupled to a pointer control device which permits a user to selectively position a pointer at a desired location on the display, and signal the CPU of selections in accordance with the teachings of the present invention. Buttons are generated by the CPU and displayed which correspond to a single function to be executed by the CPU, a window button which displays a pop-up window, an abbreviated menu button or a menu button which has associated therewith a plurality of functions disposed on a menu. The menu includes a plurality of menu items. A menu button must be provided with a menu item which is a default function which is automatically executed by the CPU when a predetermined signal is provided by the user through the pointer control device. To select and execute a menu button default, a user places the pointer over the desired menu button and momentarily depresses a switch on the pointer control device, the default function is then executed without the need to choose the menu item function from the menu button menu. Placement of the pointer over the menu button and depressing another pointer control switch results in the display of the full button menu.

8 Claims, 9 Drawing Sheets

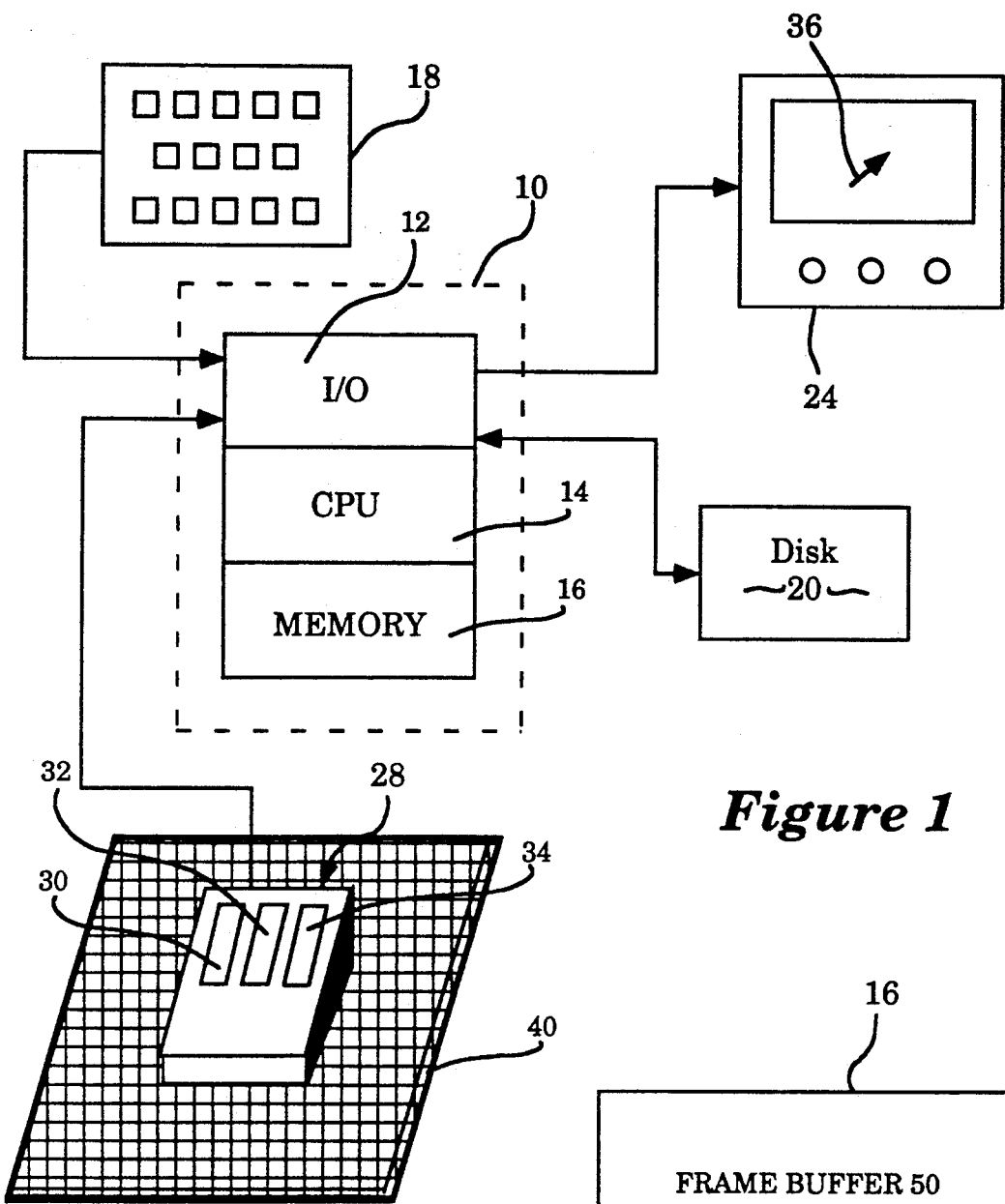
*Figure 1*
*Figure 2*
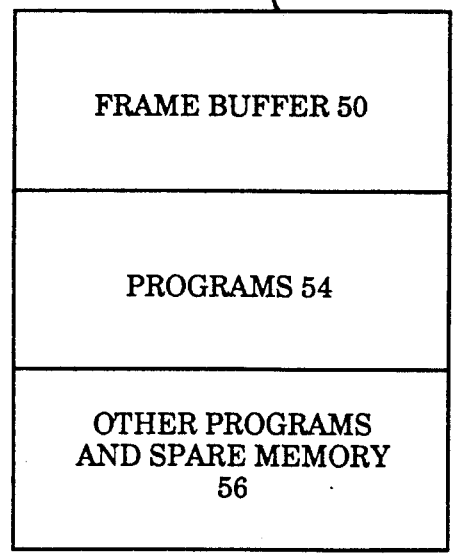

METHOD AND APPARATUS FOR SELECTING AND EXECUTING DEFAULTS IN A WINDOW BASED DISPLAY SYSTEM

RELATED APPLICATIONS

This is a file wrapper continuation of application Ser. No. 07/458,775, filed Dec. 29, 1989, now abandoned, which is a continuation-in-part of U.S. application Ser. No. 07/323,775, filed Mar. 15, 1989, now abandoned. The present application is related to U.S. patent application Ser. No. 07/619,665, filed Nov. 28, 1990, now U.S. Pat. No. 5,230,063, which is a continuation-in-part of U.S. patent application Ser. No. 07/323,774, filed Mar. 15, 1989, entitled: "Method and Apparatus for Selecting Button Functions and Retaining Selected Options on a Display", and U.S. Pat. application Ser. No. 07/703,036, filed May 17, 1991, now U.S. Pat. No. 5,57,768 which is a continuation-in-part of U.S. patent application Ser. No. 07/323,669, filed Mar. 15, 1989, entitled "Method and Apparatus for Displaying Context Sensitive Help Information on a Display", and hereby refers to, and incorporates by reference the contents of the above-referenced applications.

BACKGROUND OF THE INVENTION

1. Field of the Invention

The present invention relates to apparatus and methods for displaying and manipulating graphic information, and more particularly, the present invention relates to a computer controlled display system for selecting control functions, and retaining desired data disposed in a menu on a display regardless of other display operations in process.

2. Art Background

It is common for computer display systems to represent and convey information to a user through various graphic representations of data. Representations of data may take a variety of forms, such as for example, alphanumeric characters, Cartesian graphs, as well as shapes of well known physical objects. Today, many computer systems utilize one of a variety of object oriented user interfaces in which many previously coded programming commands are replaced with two or three dimensional graphic images on a computer display. The object oriented system utilizes various icons which symbolically indicate the type of operation the computer system will execute if the icon function is chosen. In addition, many object oriented interfaces utilize multiple "windows" displayed on the cathode ray tube (CRT) display in which combinations of text and graphics are used to convey information to a user. Each window may take the form of a variety of objects such as a file folder, loose-leaf binder, or simple rectangle, and the windows may overlap one another with the "top" window fully visible and constituting the current work file. The user may delete information from a window, move data from one window to another, and generally operate on the window as if an actual file in an office is being used. Thus the user is permitted to operate on and manipulate the window contents, and the window itself, as if the image constituted an actual object. Numerous object oriented systems exist today and are displayed on computers manufactured by the assignee: Sun Microsystems, Inc., as well as other manufacturers, including: International Business Machines, Apple Computer, Inc., and others. [See, D. Robson, "Object Oriented Software Systems", BYTE, August 1981, pg. 74, Vol. 6, No. 8; and L. Tesler, "The Small Talk Environment", BYTE, August 1981, pg. 90, Vol. 6, No. 8. See also, U.S. Pat. No. Re.32,632, reissued Mar. 29, 1988.]

Although a variety of object oriented interfaces have been developed by various computer manufacturers, the various methods by which a user interfaces with the computer display system varies significantly between machines. In addition, the functionality of the graphic interface of a computer system significantly impacts the efficiency and ease of use of the particular computer. It has been found that certain features are desirable to be incorporated into the graphic interface of object oriented computer display systems, and the present invention discloses one such significant improvement to permit a user to select button control functions, and retain certain data on the display regardless of other display operations being performed by the computer system. As will be described, the present invention provides apparatus and methods which permit a user to choose a particular object oriented function which results in the generation and display of a "menu" on the display. The present invention further permits the user to retain the contents of the selected menu on the display while the display system is performing other unrelated operations.

SUMMARY OF THE INVENTION

An apparatus and method is disclosed which has application for use in computer controlled display systems, and in particular, display systems having object oriented graphic interfaces. A central processing unit (CPU) is provided and is coupled to a display for displaying graphic and other data. The CPU is further coupled to a pointer control device which permits a user to selectively position a pointer at a desired location on the display, and signal the CPU of selections in accordance with the teachings of the present invention. Buttons are generated by the CPU and displayed which correspond to either a single function to be executed by the CPU, a window button which displays a pop-up window, an abbreviated menu button or a menu button which has associated therewith a plurality of functions disposed on a menu. The menu includes a plurality of menu items. A menu item may be identified as a default function for a particular menu button which is automatically executed by the CPU when a predetermined signal is provided by the user through the pointer control device. To select and execute a menu default, a user places the pointer over the desired menu button and momentarily depresses a switch on the pointer control device; the default function is then executed without the need to choose the menu item from the menu button menu. Placement of the pointer over the menu button and depressing the another pointer control switch, results in the display of the button menu.

BRIEF DESCRIPTION OF THE DRAWINGS

FIG. 1 illustrates a computer incorporating the teachings of the present invention.

FIG. 2 shows one arrangement of program storage for the system of FIG. 1.

NOTATION AND NOMENCLATURE

Figure 3A:
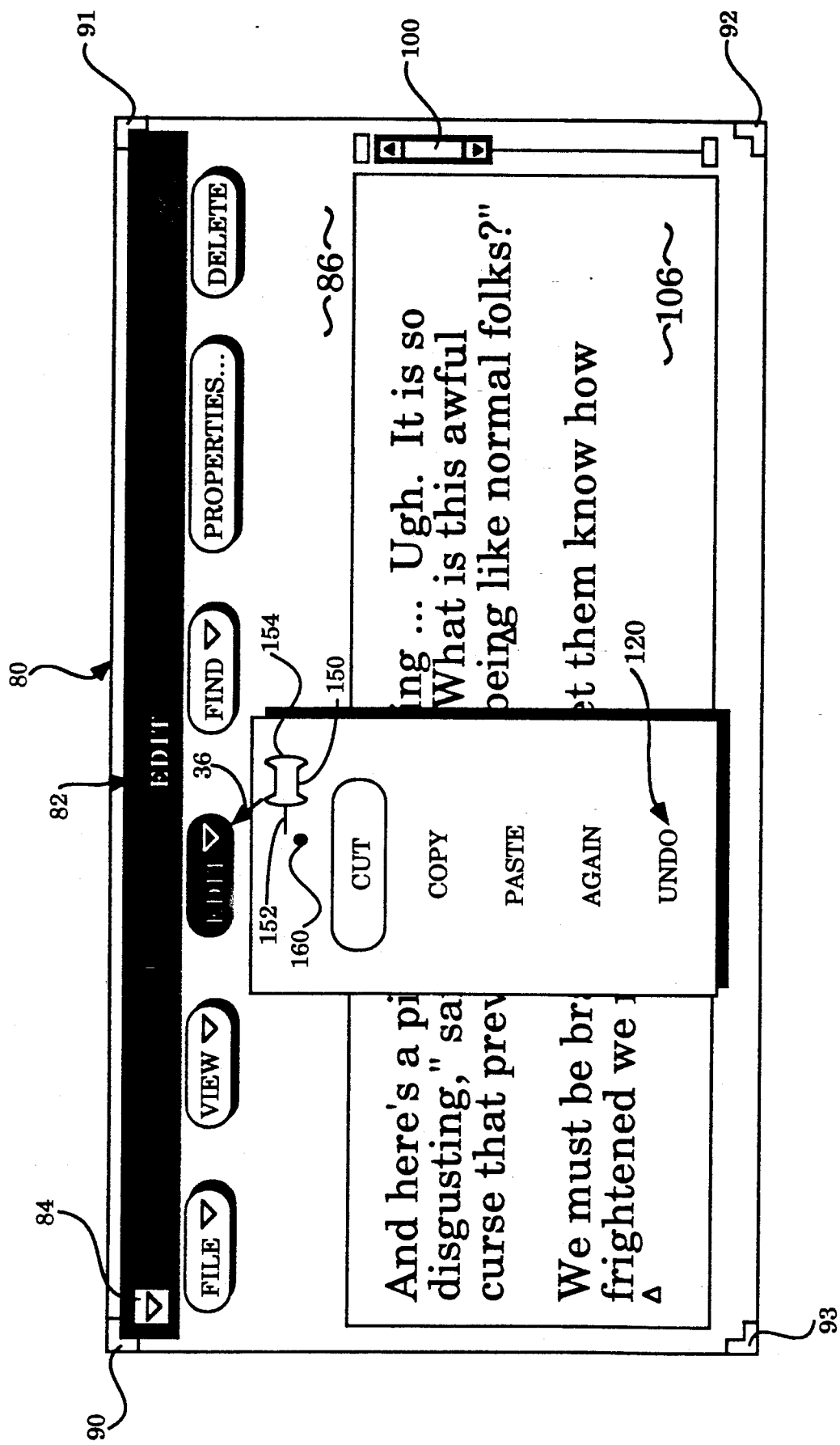
FIGS. 3(a)-(c) graphically illustrate the operation of the present invention in its preferred form.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, icons, characters, terms, numbers, or the like. It should be borne in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein, which form part of the present invention; the operations are machine operations, although when dealing with a graphic interface, by its nature, the man/machine interface utilizes some form of human input. Useful machines for performing the operations of the present invention include general purpose digital computers or other similar devices, such as, for example, those manufactured by the assignee, Sun Microsystems, Inc. In all cases there should be borne in mind the distinction between the method operations and operating a computer and the method of computation itself. The present invention relates to apparatus and methods for operating a computer and processing electrical or other physical signals to generate other desired results.

The present invention also relates to apparatus for performing these operations. This apparatus may be specially constructed for the required purpose or it may comprise a general purpose computer as selectively activated or reconfigured by a computer program stored in the computer. The images, algorithms, and data structures presented herein are not inherently related to any particular computer or other apparatus. In particular, various general purpose machines may be used with programs written in accordance with the teachings herein, or it may prove more convenient to construct more specialized apparatus to perform the required method steps. In addition, no particular programming language has been indicated for carrying out the various procedures described herein. This is due in part that the fact that not all languages that might be mentioned are universally available. Each user of a particular computer will be aware of the language which is most suitable for his immediate purposes. In practice it has been proven useful to substantially implement the present invention in an assembly language which provides a machine executable object code. Accordingly, no detailed program listings have been provided. It is considered that the operations and other procedures described herein and illustrated in the accompanying drawings are sufficiently disclosed to permit one of ordinary skill to practice the instant invention or so much of it as is of use to him/her.

DETAILED DESCRIPTION OF THE INVENTION

The present invention discloses apparatus and methods for selecting a function control and retaining desired data on a display regardless of other computer operations which may occur. In particular, the present invention discloses a unique graphic interface in which the user may choose a function default, as well as selectively retain data on the display during other computer operations. In the following description, numerous specific details are set forth such as computer display system elements, display formats, sample data, etc. in order to provide a more thorough understanding of the present invention. However, it will be apparent to one skilled in the art that the present invention may be practiced without these specific details. In other instances, well known circuits and structures are not described in detail in order not to obscure the present invention unnecessarily.

FIG. 1 illustrates a computer based system for generating graphic images in accordance with the teachings of the present invention. Shown is a computer 10 which comprises three major components. The first of these is an input/output (I/O) circuit 12 which is used to communicate information in appropriately structured form to and from other portions of the computer 10. In addition, computer 10 includes a central processing unit (CPU) 14 coupled to the I/O circuit 12 and a memory 16. These elements are those typically found in most general purpose computers and, in fact, computer 10 is intended to be representative of a broad category of data processing devices. Also shown in FIG. 1 illustrates a keyboard 18 to input data and commands into computer 10, as is well known. A magnetic disk 20 is shown coupled to I/O circuit 12 to provide additional storage capability for the computer 10. It will be appreciated that additional devices may be coupled to computer 10 for storing data such as magnetic tape drives, bubble memory devices, as well as networks which are in turn coupled to other data processing systems. As is well known, disk 20 may store other computer programs, characters, routines, etc., which may be accessed and executed by CPU 14. A raster display monitor 24 is shown coupled to the I/O circuit 12 and is used to display images generated by CPU 14 in accordance with the present invention. Any well known variety of cathode ray tube (CRT) display may be utilized as display 24. A pointer control device 28 is also shown coupled to computer 10 through I/O circuit 12. Pointer control device 28 includes switches 30, 32 and 34 for signalling CPU 14 in accordance with the teachings of the present invention. Pointer control device 28 (commonly known as a "mouse") permits a user to select various command modes, modify graphic data, and input other data utilizing switches 30, 32 and 34. More particularly, pointer control device 28 permits a user to selectively position a pointer 36 at any desired location on display 24 by movement of the pointer control device 28 over a surface 40. In the presently preferred embodiment, pointer control device 28 utilizes a well known optical method for signalling CPU 14 of positional changes of pointer 36 by movement of pointer control over a grid disposed on surface 40. However, it will be appreciated that a variety of well known pointer control devices may be utilized by the present invention, including other pointer control devices such as mechanical mice, track balls, joy sticks, etc.

FIG. 2 shows one arrangement of major programs contained within the memory 16 illustrated in FIG. 1. In particular, there is shown a frame buffer 50, which comprises a bit map of display 24. The frame buffer 50 represents the video memory for the display 24, wherein, each storage location in the frame buffer 50 corresponds to a pixel on the display 24. Thus, the frame buffer comprises a two dimensional array of points having known coordinates corresponding to the pixels on the raster display. In its simplest form, frame buffer 50 comprises a contiguous block of memory which is allocated such that each memory location is mapped onto the corresponding pixel on the rastor display 24. Memory 16 also includes a variety of other programs 54 for execution by the CPU 14. For example, a variety of control, display, and calculating programs implementing the operations and routines described in this Specification may be stored in memory 16, as well as monitor control programs and disk operating systems. Moreover, memory 16 further includes space for other programs and spare memory (56) which may be used for a variety of other well known functions and operations in data processing systems.

Referring now to FIG. 3(a), in the presently preferred embodiment, a variety of "windows" may displayed on display 24. As shown in FIG. 3(a), a representative window includes a variety of data within the bounded window, in the form of graphics, text and symbols. For example, in FIG. 3(a) there is shown a representative base window identified generally by the numeral 80, which is in the form of a rectangular area on display 24. In the example of FIG. 3(a), base Window 80 includes a window title 82 (in the present example "edit and a window menu button 84 which is displayed at the left side of the header in the window. Upon selection of the Window menu button, a variety of menu items will be displayed having functions related to the window including a function that closes the window. Preferably the close function is the default menu item for the Window menu button such that it can be easily selected using the default function as described below. By placing pointer 36 on the Window menu button 84, and momentarily activating pointer control switch 30 to select the default function "close", the window is closed. Once closed, the base window 80 is no longer displayed on display 24 and is represented on the display as an icon.

A control area 86 is provided for the display of button functions, which will be described in more detail below. Window 80 further includes resize corners 90 through 93 which are used to shrink or expand the borders of window 80, thereby changing the area of the window without changing the relative size of the controls, fonts, icons, etc. displayed within window 80. CPU 14 further displays the image of a vertical scrollbar 100, as shown, which permits text, graphics and the like within the working area 106 of window 80 to be scrolled in the direction in which the scroll bar is "pulled". The scrollbar, in the presently preferred embodiment may be moved by placing pointer 36 over the arrows of the scrollbar 100 and activating a selected switch on pointer control device 28, or alternatively, by placing the pointer 36 on the scrollbar, depressing a preselected switch on pointer control 28, and moving the pointer control device in the direction in which the text or the like within the working area 106 is to be scrolled. Although not shown, window 80 may also incorporate the use of a horizontal scrollbar to selectively scroll horizontally through the text, graphics, etc. disposed within the working area 106.

As shown in FIG. 3(a), a plurality of button functions may be disposed within window 80. Although the button functions (in the present example entitled: "file", "edit", "view", "find", "properties", and "delete") are illustrated in area 86, the button control functions may be displayed in other control areas, as will be described below. Although illustrated horizontally, button functions may also be arrayed vertically within the window, and button function names may be in the form of text and/or graphics. In the presently preferred embodiment, button functions may take the form of a single button function, menu buttons, window buttons and abbreviated buttons. A single button function is used for a single command to be executed by CPU 14 (for example "Delete"). A menu button is used to group commands, referred to as menu items, together in logical sets on a menu which is displayed when the particular menu button is chosen by a user. Typically, the label on the menu button is the title or category name of the group of menu items on the menu and submenus, and not one of the menu items (for example, "edit").

A window button opens a pop-up window, which is described in detailed below. A window button is represented by a window mark (. . .) following the button's label suggesting "more to come". An abbreviated button provides a compact form of a button (e.g., single button function, menu button and window button), when it is desirable to omit the label inside the button to save space by omitting the label altogether or to place the label outside the button. For example, the menu button 84 is an abbreviated menu button.

Figure 5:
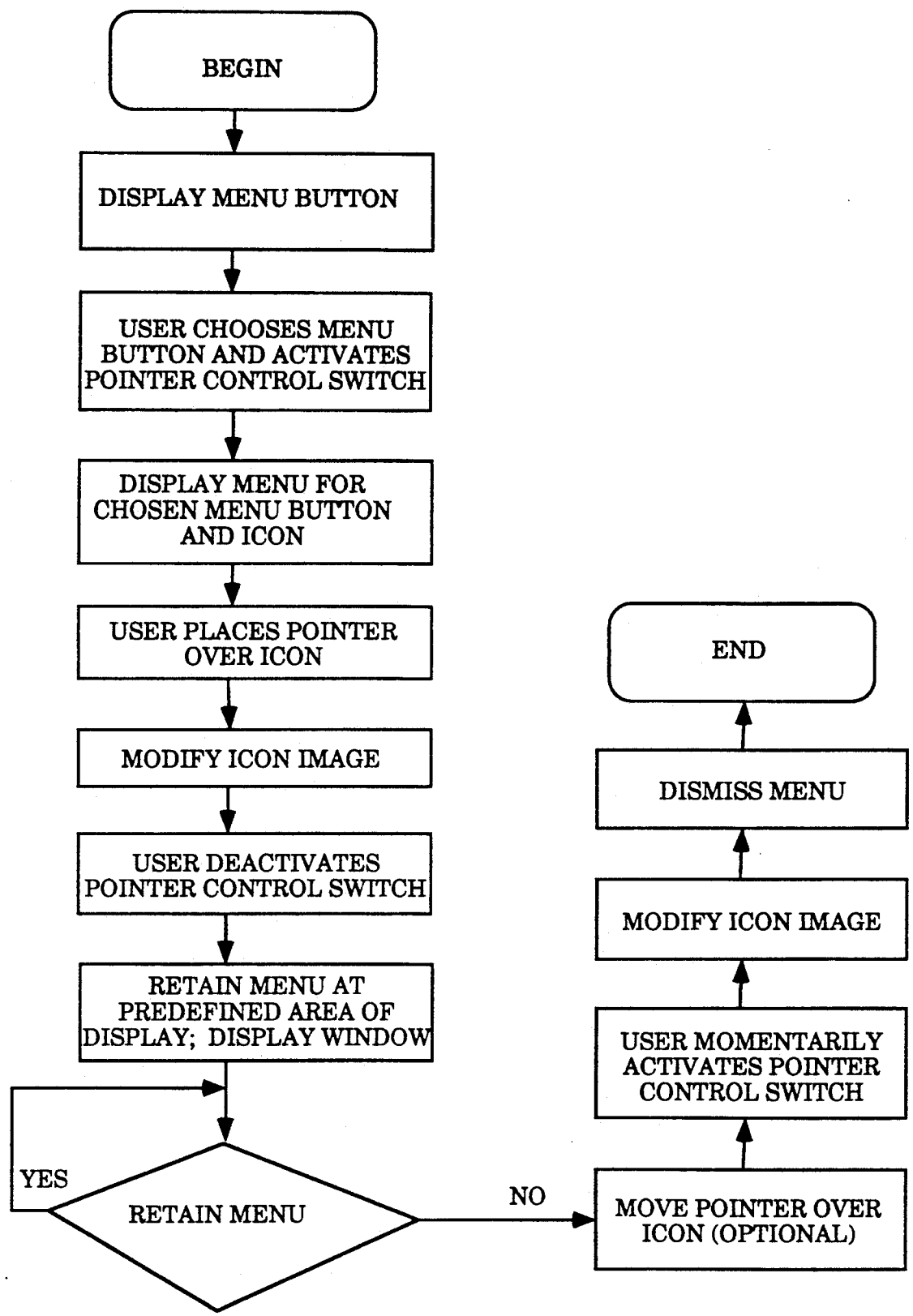
FIG. 5 is a flow chart illustrating the sequence of steps utilized by the present invention to retain specified data on the display, regardless of other display operations.

As shown in FIG. 3(a), and illustrated in the flow chart of FIG. 5, appropriate programming of computer 10 is provided such that a plurality of menu buttons and/or single button functions are displayed within window 80. In the example of FIG. 3(a), window 80 includes six buttons, identified as "edit", "file", "view", "find", "properties", and "delete". The placement of the Pointer 36, over the "delete" button of FIG. 3(a) by a user utilizing a pointer control device 28, and the activation of a switch (for example, switch 34) on the pointer control device 28 by a user, results in the computer 10 executing the delete function of a selected object. The placement of pointer 36, over the "edit" menu button of FIG. 3(a) by a user utilizing pointer control device 28, and the activation of a switch (for example, switch 34) on the pointer control device 28 by a user, results in computer 10 generating and displaying a menu 120 below the corresponding menu button (in the present example, "edit") as illustrated. Activation of a switch (for example, switch 34) of the pointer control device 28 while the pointer is within a region (for example, the base window) or on an object may also activate a menu. As shown, menu 120 includes a plurality of items which correspond to executable functions by CPU 14. In the present example, menu items disposed within menu 120 include such functions as "cut", "copy", "paste", "again" and "undo", which may be chosen by a user utilizing pointer control device 28. In addition, menus may include settings which can be set or changed. The selection of a menu item by a user results in the immediate execution of the function by CPU 14.

Figure 6:
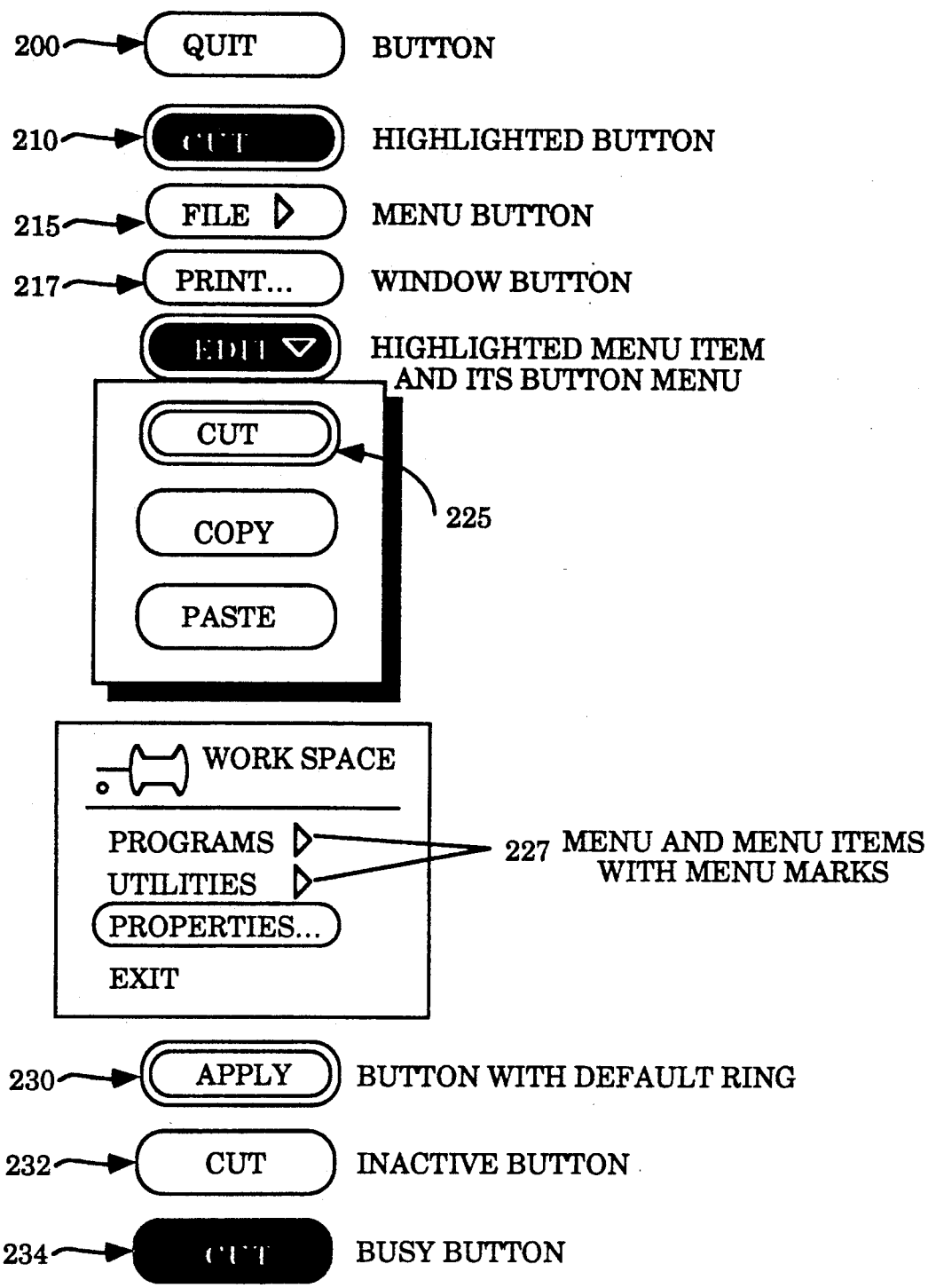
FIG. 6 illustrates the present invention's visual feedback for button function controls.

Menu items are similar to buttons and provide the same functionality as single buttons, window buttons and menu buttons. Referring to FIG. 6, a menu for the workspace 226 containing four types of menu items are displayed. "Programs" and "Utilities" are menu items. The menu mark 227 points to the right to show that the submenus for the particular menu items will be displayed to the right of each item. The item "Properties" is a window item; choosing it displays a property window. "Exit" is a single command item; choosing it exits the workspace.

Frequently, the commands corresponding to the items on a menu are required by a user throughout a variety of operations of the display system of the present invention. As is known, in many prior art systems the selection of a command function on a menu results in the immediate execution of the selected command and the dismissal of the menu such that it is no longer displayed to the user. Accordingly, in order to perform additional functions requiring the items disposed within menu 120, the user must once again choose the edit menu button using pointer 36 as well as the particular item on menu 120 which is desired. As will be described more fully below, the present invention permits menu buttons [such as "edit" in FIG. 3(a)] to include a default function which may be previewed by a user prior to execution (see FIGS. 6 and 7(a)-(c) without the necessity of displaying the entire menu associated with the particular menu button.

Figure 3B:
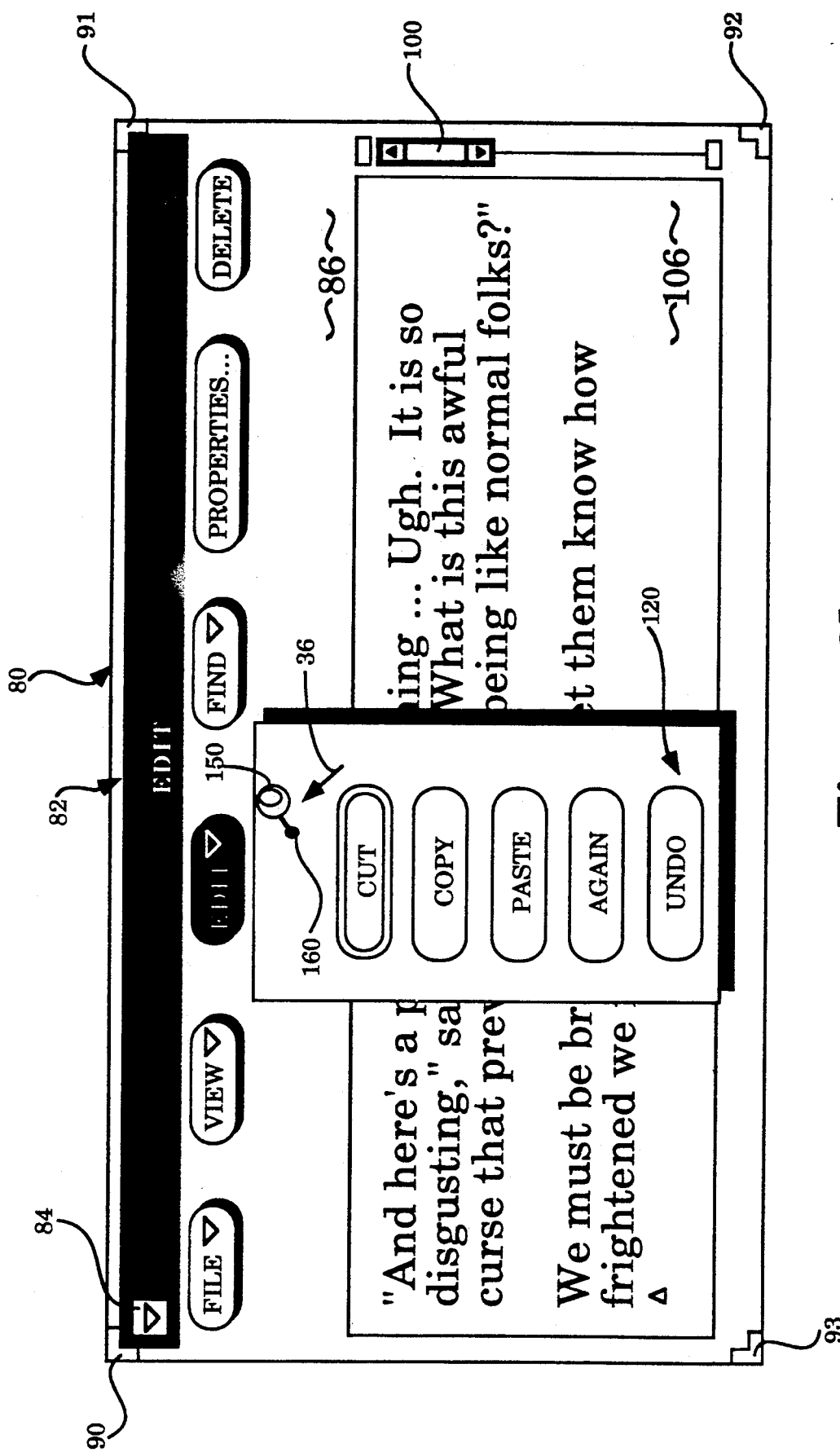
Figure 3C:
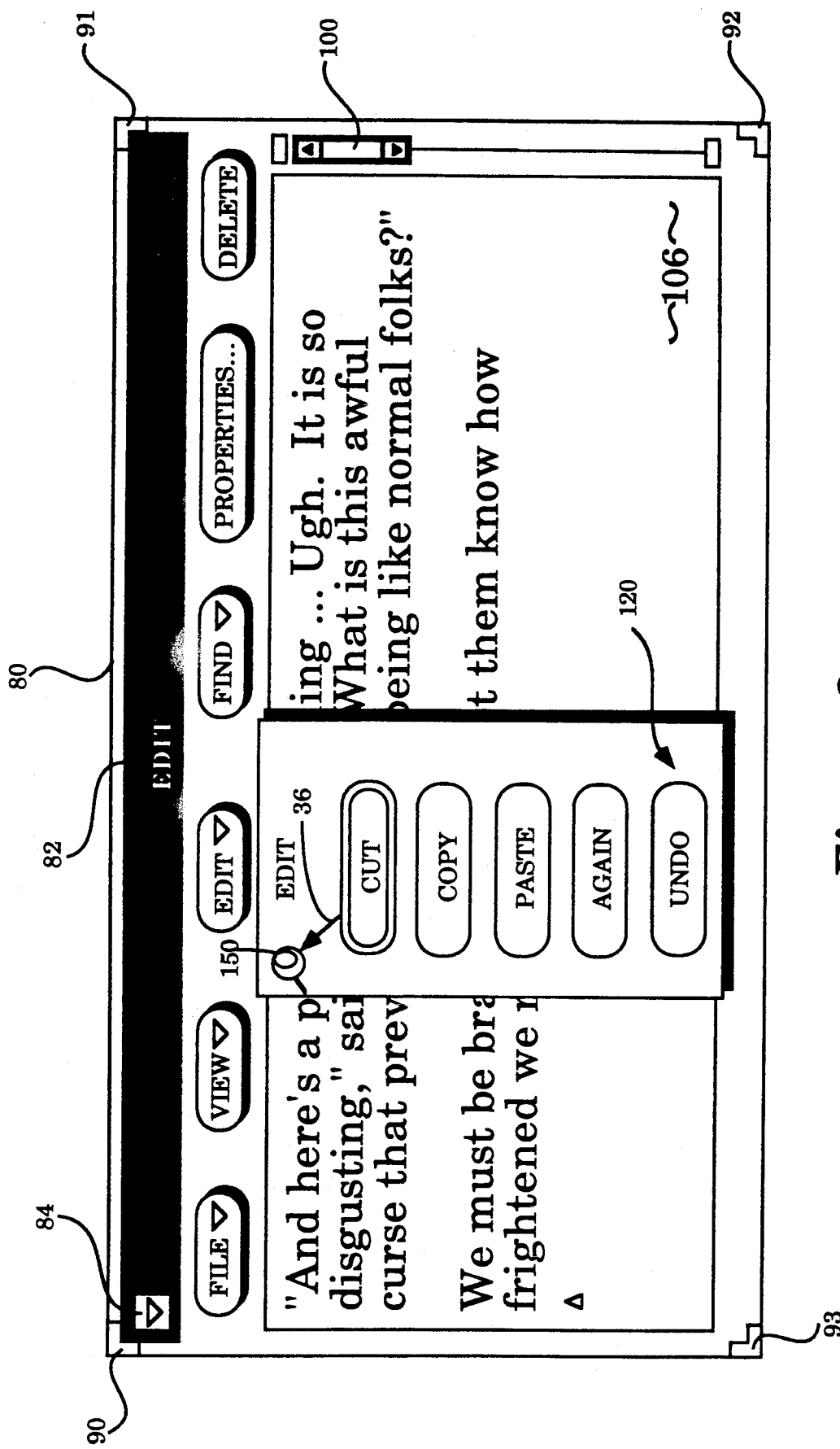

To avoid the inefficient and time consuming requirement of reselecting a particular menu button within window 80 to execute a particular item disposed within a menu (such as menu 120), the present invention incorporates an apparatus and method to retain the menu on the display 24 regardless of other operations executed by computer 10 for display. In accordance with the teachings of the present invention, an icon 150 is provided, and is shown in FIGS. 3(a)-3(c), which may be selected by a user using pointer control device 28 to retain the menu on the display. If the user desires to retain a menu (for example menu 120) on display 24, the menu button is chosen by placing the pointer 36 over the particular menu button desired. The user then signals CPU 14 of the selection by depressing a switch disposed on pointer control device 28 (switch 34). The CPU 14 displays the corresponding menu containing at least one menu item, as well as icon 150. As illustrated, in the presently preferred embodiment icon 150 takes the form of a "pushpin" including a pin 152 and a pin head 154. In addition, in the presently preferred embodiment computer 14 further displays a small open circle 160 symbolically illustrating a pin hole.

Subsequent to the selection of a menu button (for example the "edit function") and before choosing an item on the menu, the user "drags" the pointer 36 down such that it is over at least a portion of icon 150. As illustrated in FIG. 3(b), once pointer 36 has been dragged to overlay at least a portion of icon 150, CPU 14 modifies the icon image such that it appears to the user that the pin 152 has been inserted into pin hole 160, thereby conceptually "pinning" the menu 120 onto the display 24.

As shown in FIG. 3(c), the deactivation of the pointer control switch (for example switch 32) notifies CPU 14 of the selection of icon 150 and CPU 14 then retains menu 120 on display 24, as will be described. Alternatively, the user may release the switch disposed on pointer control device 28, but before choosing an item on a menu, the user may pin the menu 120 to the display by moving the pointer such that it is located over at least a portion of the icon 150, and providing predetermined signal to the CPU, for example by depressing and releasing the same or another switch disposed on pointer control device 28. The CPU responds to these signals by modifying the icon image such that it appears that the pin has been inserted into the pin hole 160 and retaining the menu on display 24.

The selection of icon 150 converts the menu 120 into a window. For purposes of this Specification, the converted menu 120 is referred to as the "menu (window) 120". As illustrated in FIG. 3(c), CPU 14 displays the title of the button function corresponding to menu (window)120 (in a present example "edit") at the top of the window. In another embodiment, a pushpin is also displayed in the header which provides funtionality similar to that described below with respect to pushpin 152 of FIG. 4(b). In addition, a Window menu is associated with the menu (window) which ma I be accessed by selecting on a portion of the window. As a window, the menu 120 may be manipulated on the display 24 like any other window. For example, the window may be repositioned on the display using the pointer control device 28. The movement of the menu (window) 120 to another location on the display is illustrated in FIG. 4(a).

Other types of windows may include pushpins, such as pop-up windows. A pop-up window is a transitory window that may contain controls, that is, buttons, options and parameters to permit the user to review the content of a window, select functions, fill in information or make choices. Pop-up windows have a pushpin (icon 150) so that the window may be "pinned" to the screen. Pop-up windows allow more flexibility than menus in the number, arrangement and types of items. For example some pop-up windows allow the user to specify multiple items and then choose the "Apply" button to have all of the changes take effect. This is illustrated in the property pop-up window of FIG. 4(b) which shows a pop-up window displayed by selecting and activating the "Properties" window button shown in FIG. 3(a). The property pop-up window includes controls and settings which can be chosen and applied by the user to affect the window display.

Figure 4A:
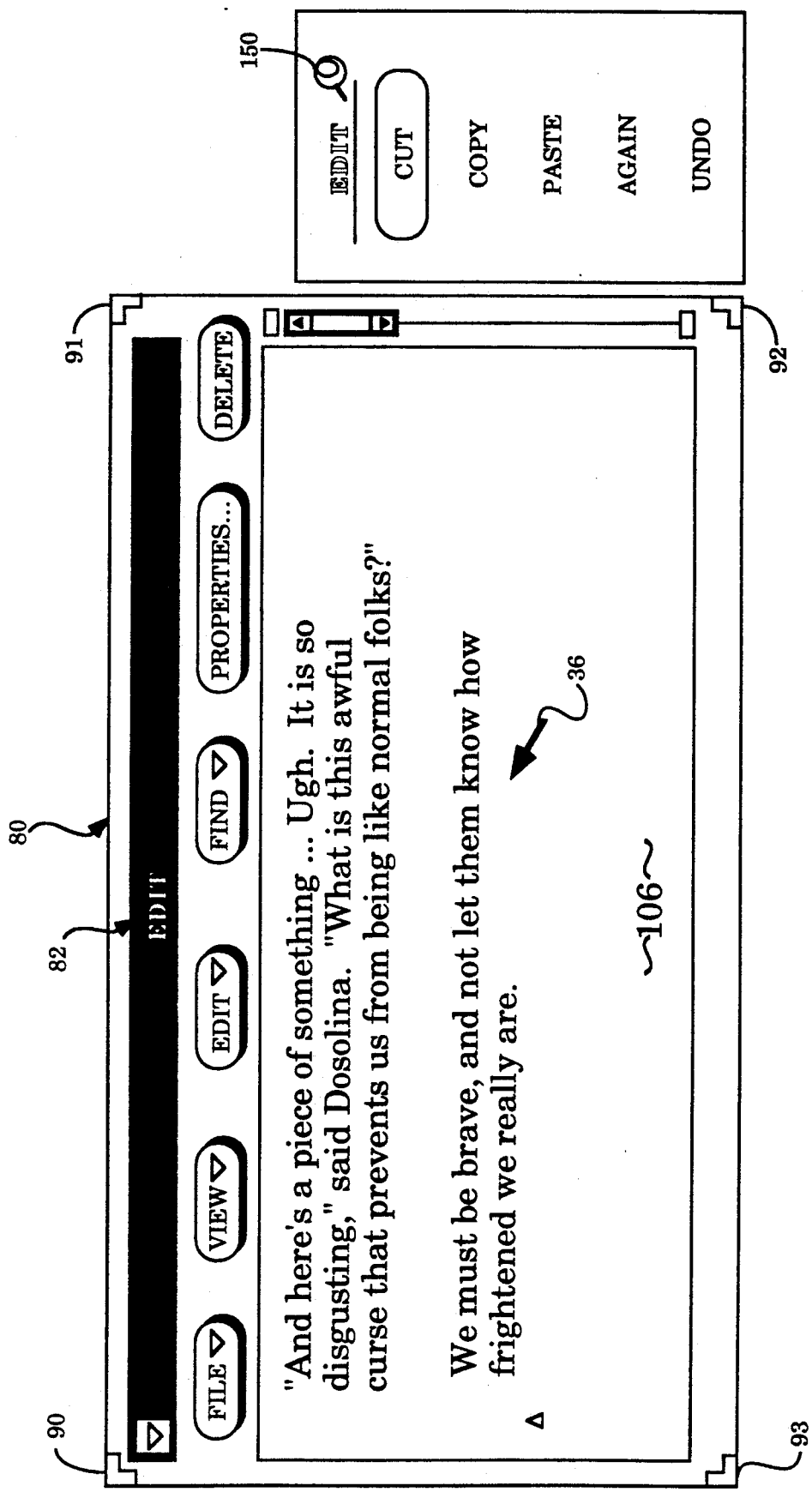
FIGS. 4(a) and 4(b) illustrate additional features of the present invention wherein selected a is displayed in a separate predefined areas of the screen.
Figure 4B:
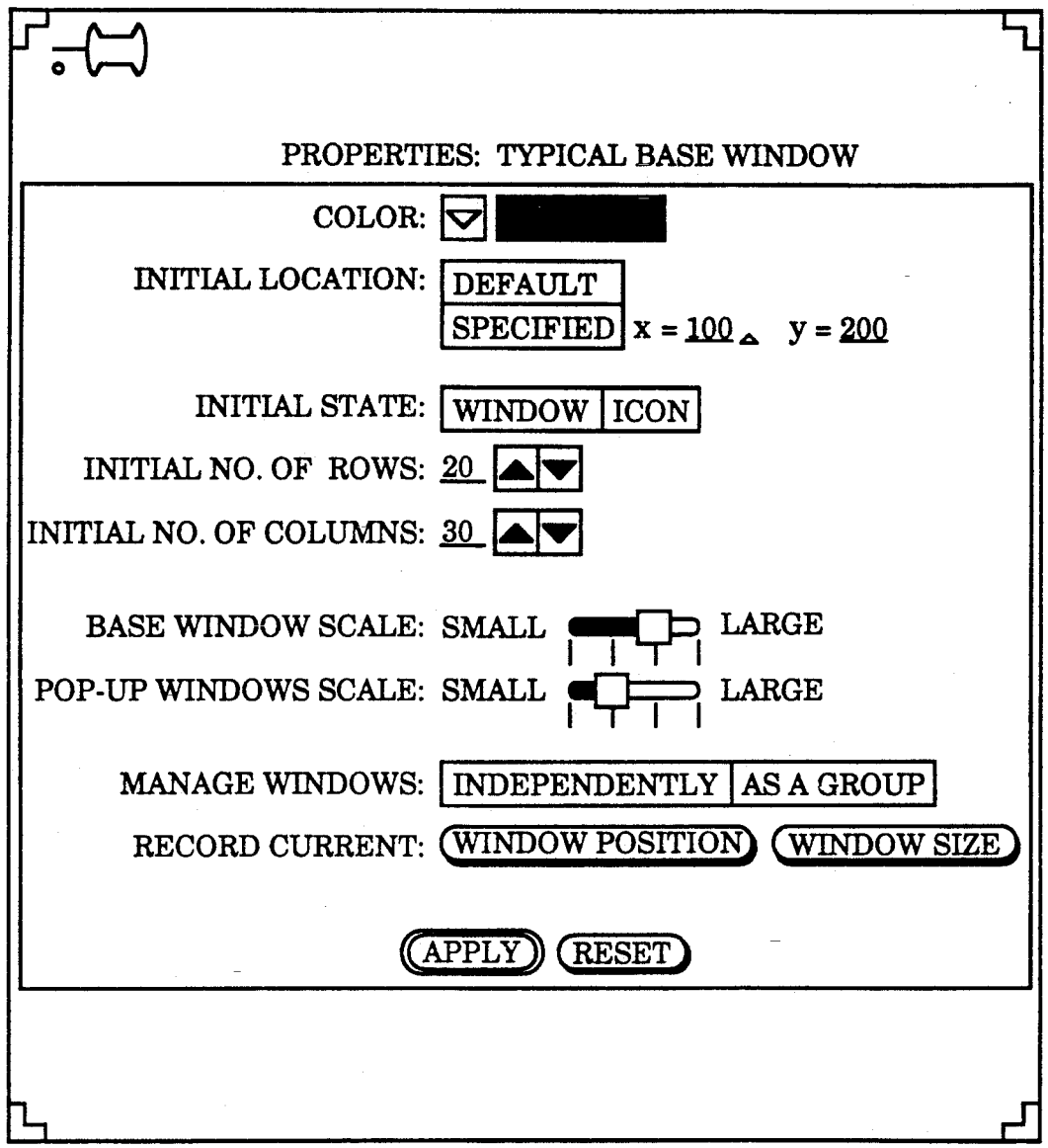

Referring now to FIG. 5 in conjunction with FIG. 4(a), if a user desires to no longer retain menu (window) 120 on display 24, then to dismiss the menu (window) 120 such that it is no longer displayed, he must place pointer 36 over the pushpin, and momentarily activate a pointer control switch on pointer control device 28. The menu 120 will then no longer be displayed unless the original button function (in the present example "edit") is again chosen by the user. Similarly in the case of a pop-up window, the "unpinning" of the pop-up window 120, FIG. 4(b), results in its immediate dismissal and non-display. In an alternative embodiment, the menu (window) 120 or the pop-up window may be dismissed by executing the "dismiss" function through the window menu associated with the menu (window)

120, the pop-up window or by depressing a predetermined key on the keyboard.

Referring now to FIGS. 6 and 7a-7c, and the present invention permits menu buttons to include a default function which is automatically executed by the CPU 14 when a predefined signal originating from pointer control 28 (switch 30) is provided by a user. Menu button defaults provide a quick and convenient way for a user to perform a function while still providing the flexibility to permit the user to make a different choice from a menu, or quickly change the default setting. A default setting is provided for any menu button, including menu buttons in control areas such as the "edit" menu button illustrated in FIG. 3(a), the "cut" menu item disposed on the menu 120, and the window menu button 84 disposed in the header. Typically the window menu button will have the default function set to be the "close" function such that execution of the default function will close the window to an icon representative of the window.

As best shown in FIG. 6, a single button function is illustrated and identified by the numeral 200. As previously described, single button functions are used for single commands to be executed by the CPU. The title (for example in FIG. 6, "quit") is the name of the button function to be executed. Button functions may be disposed within a window singly, or arrayed in horizontal or vertical groups. As illustrated in the figures, if a user places pointer 36 over at least a portion of the button function and chooses the button function by, for example, depressing a switch on the pointer control device 28, CPU 14 highlights the button function. An example of a highlighted button function is shown in FIG. 6, and identified by the numeral 210.

A menu button is identified by the menu mark "V" as shown in FIG. 6 by the numeral 215. The direction of the mark indicates the location where the corresponding menu is displayed. By placing the pointer 36 over at least a portion of the menu button illustrated in FIG. 6, numeral 215, and choosing the menu button, a menu is generated corresponding to the menu button chosen. This is described above more fully with reference to FIGS. 3(a)-3(c) relating to the menu button "edit". Similarly, when a window button 217 is chosen, a pop-up window is displayed to the user. A menu item may also have a menu mark associated with it indicating that a menu is associated with the menu item. This is illustrated in FIG. 6 wherein menu "workspace" 226 has two menu items, "Programs" and "Utilities" 227 which have menus associated with them. The menus may be displayed by positioning the pointer over the menu item 227 and depressing a switch on pointer control device 28 while dragging the pointer in the direction of the menu mark. An item may be selected from the subsequently displayed window by positioning the pointer control device over the menu item desired and releasing the switch on pointer control device 28.

As illustrated in FIG. 6, a menu button which includes a default control is identified in the menu by a ring around the item. The default controls can include menu settings as well as menu items and may be selected or changed by the user. For example, in the menu shown in FIG. 6, the default control is the "cut" item identified by numeral 225. The default can be easily changed by the user to one of the other menu items by choosing the menu, depressing a key or switch indicative of the "modify menu default" function, dragging the pointer to the menu item the user desires to be the default and releasing the key or switch. The numeral 230 illustrates a menu button with a default ring in which, as explained below, the default item may be executed without the display of a menu. In addition, the buttons 232 and 234 are illustrative of the button feedback provided to the user to assist the user in operating the buttons. More particularly, button 232 indicates to the user that the button function is inactive, that is, unavailable to the user. Button 234 indicates to the user that the button is busy, and the corresponding function is currently in use.

With reference now to FIGS. 7a-7c and 3(a)-(c), the present invention's use of a menu button is described, which permits and combines menu and command mechanisms into a single user action. As described above and as best shown in FIGS. 3(a)-(c), the selection of the "edit" menu button results in the display of menu 12 which includes an item entitled "cut". A user desiring to execute the "cut" command may first choose the "edit" menu button and then place the pointer over at least a portion of the item entitled "cut", and signal the computer of the selection as described relative to FIGS. 3(a)-(c).

Figure 7A:
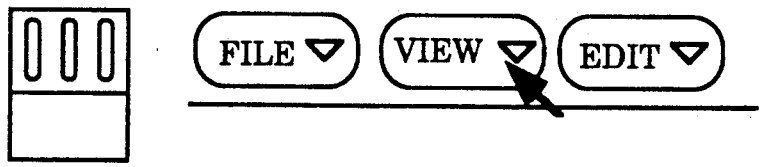
FIGS. 7a-7c illustrate the viewing of a button function default utilizing the teachings of the present invention.
Figure 7B:
Figure 7C:
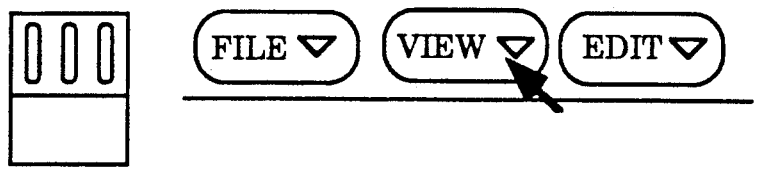

However, the present invention also permits the user to select a function, for example, "cut", as the default setting for a menu button (in the present example "edit"). In order to execute the "cut" default command in the present example, the user simply places the pointer 36 over a portion of the "edit" menu button, and depresses a predetermined switch (for example, switch 30) on pointer control device 28. CPU 14, sensing the activation of switch 30, displays the title of the default function (in the present example "cut") within the highlighted button, such that the default operation replaces the title of the button. The default operation ("cut") is selected by deactivating switch 30 on pointer control device 28. The default function is then executed by CPU 14 and thereby avoids the need for a user to execute additional steps to choose the command from the menu. This is illustrated in FIGS. 7a-7c for the item "Magnify" which is the default item for the "View" menu button. The pointer is positioned over the "View" menu button and the predetermined switch is depressed resulting in the display of the "Magnify" default item as the title of the menu button. Upon release of the switch the default function is executed. The default operation is typically initialized to a pre-determined function but can be changed by the user to any of the button functions displayed on a menu corresponding to a menu button.

Although the present invention has been described with reference to particular window examples in FIGS. 1-7c, it will be appreciated by one skilled in the art that the present invention may be implemented in any one of the number of various windows and window configurations on a display system. Similarly, particular button functions illustrated in the figures are only representative of one of many possibilities of button and command configurations which may utilize the present invention. Moreover, it will be understood that the figures are for illustration only and should not be taken as limitations upon the invention. It is contemplated that many changes and modifications may be made, by one of ordinary skill in the art, to the materials and arrangements of the elements of the invention without departing from the sphere and scope of the invention as disclosed above.

We claim:

1. In a computer display system having a display coupled to a central processing unit (CPU) for displaying data, said data including at least one menu button, said menu button corresponding to a plurality of non-displayed menu items including a default menu item, a method for choosing and executing said default menu item without displaying and choosing from said plurality of menu items, comprising the steps of:
   (a) generating and displaying said menu button on said display;
   (b) positioning a pointer on said display using a pointer control device coupled to said CPU, said pointer being placed over at least a portion of said menu button;
   (c) providing a first signal to said CPU to denote the selection of said default menu item, said first signal being generated by a user placing a switch coupled to said CPU in a first position;
   (d) modifying the visual appearance of said menu button to identify said default menu item;
   (e) placing said switch in a second position;
   (f) returning said menu button from said modified visual appearance to said menu button's original appearance and executing said default menu item without displaying said plurality of menu items;
   whereby said default menu item is chosen by the user and executed by said CPU.

2. The method as defined by claim 1 wherein step (d) includes modifying said visual appearance by displaying the title of said default function on said menu button.

3. The method as defined by claim 2 wherein step (d) further includes modifying the color shade of said menu button.

4. The method as defined by claim 1 wherein said menu button is in the shape of an oval.

5. In a computer controlled display system having a display coupled to a central processing unit (CPU) for displaying data, said data including at least one menu button, said menu button corresponding to a plurality of non-displayed menu items including a default menu item, a method for choosing and executing said default menu item without displaying and choosing from said plurality of menu items, comprising the steps of:
   (a) generating and displaying said menu button on said display, said menu button including a title;
   (b) positioning a pointer on said display using a pointer control device coupled to said CPU, said pointer being placed over at least a portion of said menu button;
   (c) providing a first signal to said CPU to denote the selection of said default menu item, said first signal being generated by a user depressing a switch on said pointer control device;
   (d) modifying said menu button such that a title corresponding to said default menu item replaces said menu button title and a ring is displayed around said menu button;
   (e) releasing said switch on said pointer control device;
   (f) returning said menu button to said menu button's original appearance by replacing said title corresponding to said default menu item with said menu button title, ceasing to display said ring, and executing said default menu item without displaying said plurality of menu items;
   whereby said default menu item is chosen by the user and executed by said CPU.

6. The computer controlled display system of claim 5, wherein said menu button is a Window menu button and said default function is a function to close the window.

7. The computer controlled display system of claim 6, wherein said Window menu button is an abbreviated menu button.

8. The computer controlled display system of claims 1 or 5, wherein said menu button's original appearance is identified by the symbol "∇".

* * * * *